United States Patent [19]

Donado

[11] Patent Number: 5,021,303

[45] Date of Patent: Jun. 4, 1991

[54] MOLTEN CARBONATE FUEL CELL START-UP PROCESS

[75] Inventor: Rafael A. Donado, Chicago, Ill.

[73] Assignee: Institute of Gas Technology, Chicago, Ill.

[21] Appl. No.: 451,567

[22] Filed: Dec. 18, 1989

[51] Int. Cl.$^5$ .............................................. H01M 8/14
[52] U.S. Cl. ......................................... 429/16; 429/13
[58] Field of Search ............................ 429/13, 16, 24

[56] References Cited

U.S. PATENT DOCUMENTS

| | | | |
|---|---|---|---|
| 3,544,374 | 5/1966 | D'Alessandro et al. | 429/16 |
| 4,317,866 | 3/1982 | Trocciola et al. | 429/41 |
| 4,555,452 | 11/1985 | Kahara et al. | 429/13 |
| 4,680,240 | 7/1987 | Furukawa et al. | 429/13 |
| 4,797,379 | 1/1989 | Patel et al. | 429/16 X |
| 4,810,595 | 3/1989 | Kahara et al. | 429/16 |

FOREIGN PATENT DOCUMENTS 738054  7/1966  Canada ................... 429/13

*Primary Examiner*—Stephen J. Kalafut
*Attorney, Agent, or Firm*—Thomas W. Speckman; Douglas H. Pauley

[57] ABSTRACT

A molten carbonate fuel cell start-up process wherein at least one cell unit having a metallic cathode, a metallic anode, and green tapes of electrolyte matrix and electrolyte carbonate between the cathode and anode is heated to temperatures about 250° to about 350° C. in the presence of oxygen-containing gas with continued heating to temperatures above the melting point of the carbonate electrolyte in the presence of inert gas and about 0.5 to about 10 mole percent hydrogen, based upon the total gas composition, and maintaining temperatures above the melting point of the carbonate electrolyte for a time sufficient for the carbonate to distribute itself to the cell components, and then introducing oxidant gas to contact the cathode and fuel gas to contact the anode for operation of the fuel cell. The start-up process according to this invention provides simultaneous oxidation and lithiation of the cathode and provides good electrical conductivity and catalytic properties of the cathode for stable fuel cell operation.

21 Claims, No Drawings

MOLTEN CARBONATE FUEL CELL START-UP PROCESS

BACKGROUND OF THE INVENTION

1. Field of the Invention

This invention relates to a process for operation of molten carbonate fuel cells, particularly to a heating process used during initial start-up of a single cell or cell stack to ensure high electrolyte saturation of the cathode, high catalytic activity of the cathode, and high electrical conductivity of the cathode. These factors ensure good operating performance of the cell or cell stack.

2. Description of the Prior Art

Presently, molten carbonate fuel cell components, anode, bubble barrier, cathode, and electrolyte materials are produced by a tape casting process in which the desired component material is mixed with a binder, a solvent, and other organic compounds to make a thick slurry, from which the component is cast. The binder remains after the solvent and other organic compounds evaporate. The anode, bubble barrier, and cathode, which are comprised primarily of metallic powders, are then heated to temperatures of about 800° to 1100° C. to sinter the powder material into a compact porous metallic structure, during which heating the binder is eliminated. The cell or cell stack is then assembled and freshly cast tapes of the electrolyte matrix and electrolyte carbonate are assembled into the individual cell or cell stack. These tapes are known as "green tapes" because they still contain the binder. The binder must be removed prior to melting of the electrolyte. Best results for binder removal have been obtained using air or an oxygen-containing gas at temperatures of up to about 450° C. However, this results in premature oxidation of the metallic cathode. It is necessary that oxidation of the cathode take place after the electrolyte melts, otherwise high cell resistance results as a consequence of low lithium content in the lithiated nickel oxide cathode produced in the final oxidation process. It is most desireable that oxidation of the cathode occur only after it is wet with carbonate electrolyte, such as lithium-containing electrolyte. Presently, heat-up processes lasting up to seven to eight days are required for elimination of the binder and generally comprise heating to about 250° to 300° C., usually about 250° C., using air or an oxygen-containing gas, since at those temperatures little oxidation of the nickel-containing cathode results. Above about 250° to about 500° C. an inert gas, generally nitrogen, is used during heating to prevent premature oxidation of the cathode. After the carbonate electrolyte melts at about 485° C., regular process oxidants are commenced. However, gases from the decomposing binder and oxygen impurities in the inert nitrogen can be sufficiently high to produce premature oxidation of the metallic cathode. Further, undesired dry oxidation of the metallic cathode can occur after switching to oxidant gases if sufficient time has not been allowed for the carbonate electrolyte to soak into the cathode.

U.S. Pat. No. 4,810,595 teaches improvement or rejuvenation of voltage output during molten carbonate fuel cell operation by operating under load conditions with reduced or complete elimination of the flow of fuel and/or oxidant. Improved performance is observed after the active gas flow is restored, due to improved wetting of the electrodes. As recognized by the '595 patent, such improved cell output is observed only when the cell has fallen to low performance and the improvement is followed by subsequent decrease in cell operating performance.

U.S. Pat. No. 4,317,866 teaches use of high purity ceria as an anode material to provide oxidation resistance. U.S. Pat. No. 3,544,374 teaches hydroxide electrolyte fuel cells having a solid, hydrogen permeable metallic membrane anode. During start-up and shut-down corrosion or deterioration of the membrane is reduced by removal of hydrogen from the area of the metallic membrane and application of a negative DC potential to the anode making the anode negative with respect to the cathode and chemically inactive with respect to the electrolyte.

SUMMARY OF THE INVENTION

This invention provides a molten carbonate fuel cell start-up process wherein at least one cell unit comprising a metallic cathode, a metallic anode, and green tapes comprising electrolyte matrix and electrolyte carbonate between the cathode and anode is heated to temperatures about 250° to about 350° C. in the presence of oxygen-containing gas, followed by continuance of heating to temperatures above the melting point of the carbonates electrolyte, generally about 500° to about 650° C., in the presence of inert gas and about 0.5 to about 10 mole percent hydrogen, based upon the total gas composition. The temperatures are maintained above the melting point of the carbonates electrolyte, generally at about 500° to about 650° C., for a time sufficient for the carbonate electrolyte to distribute itself to the cell components. Oxidant gas to contact the cathode and fuel gas to contact the anode may then be introduced for operation of the fuel cell.

The process of this invention prevents or chemically reduces undesired premature oxidation of the metallic cathode prior to electrolyte melting and impregnation into the cathode. Premature oxidation results in low electrical conductivity of the cathode. The process also ensures good electrolyte penetration of the cathode and thereby good electrical conductivity and high catalytic properties. The process of this invention provides faster binder removal from the green tapes of electrolyte matrix and electrolyte carbonate than prior processes.

DESCRIPTION OF PREFERRED EMBODIMENTS

The molten carbonate fuel cell start-up process of this invention is applicable to molten carbonate fuel cells, either in individual cell form or in cell stack form, as are well-known to the art. Such cells are assembled with porous metal electrodes principally of nickel, cobalt or mixtures thereof on each side of green tapes of electrolyte matrix and electrolyte alkali metal carbonates. The electrolyte carbonates are usually ternary or binary mixtures of, for example, lithium carbonate, potassium carbonate, and sodium carbonate which is pasty or liquid at typical cell operating temperatures of about 600° to about 700° C. The carbonate electrolyte is held by an inert particulate or fibrous electrolyte matrix which remains solid during cell operation and maintains space between the cathode and anode preventing mixing of reactants from opposite electrode regions.

According to the process of this invention, the start up heating of an individual cell or cell stack is conducted under controlled conditions to remove binder from the electrolyte matrix and carbonates tapes. It is important to cell operation to avoid cathode oxidation while obtaining good binder removal and good electrolyte saturation. The heating may be conducted by placing the cell or cell stack in a controlled temperature oven or by applying electrical resistance heating through the metallic components of the cell or cell stack. During the start-up heating process, the gas environment in the anode, the cathode, and the electrolyte region of the individual cell or cells may be controlled by controlling the gas composition in the heating furnace or may be controlled by passage of the desired gas through both the oxidant and fuel flow systems of the individual cells.

According to the process of this invention, the cell is heated to temperatures about 250° to about 350° C. in the presence of oxygen-containing gas. Any oxygen-containing gas which does not have interfering reactive components may be used. Air, oxygen-enriched air, and $CO_2$-containing air are satisfactory oxygen-containing gases for use in the process of this invention, air being preferred from a practical standpoint. The process of this invention permits heating of the cell in the presence of oxygen-containing gas to a higher temperature than prior processes. In prior processes, heating in the presence of oxygen-containing gas to temperatures above about 300° C. resulted in inferior cell operation due to undesired premature oxide formation on the cathode. According to the present process, it is preferred to heat the cell to about 300° to about 350° C. in the presence of oxygen-containing gas to most effectively remove organic binder from electrolyte matrix tape and electrolyte carbonate tape. According to the process of this invention, premature oxidation of metallic cathode materials may occur to a small extent during heat-up to as high as 350° C.

Heating of the cell to temperatures above the melting point of the carbonates electrolyte, generally to about 500° C. to about 650° C., is then continued in the presence of an inert gas and about 0.5 to about 10 mole percent hydrogen. Any gas which remains inert at the temperatures involved and does not contain appreciable amounts of oxidants active under these conditions is suitable, nitrogen being a preferred inert gas. Preferable amounts of hydrogen for use with the inert gas are about 1 to about 5 mole percent and preferable upper temperatures are about 600° to about 650° C. The presence of small amounts of hydrogen during heating from a lower temperature of about 250° to 350° C. to a higher temperature of about 500° to 650° C. provides a reducing atmosphere which not only prevents oxidation of the metallic cathode material, but also chemically reduces any undesired oxides formed while the cathode was in the presence of an oxidizing atmosphere. The inclusion of hydrogen to form a reducing atmosphere surrounding the cathode during this process stage also permits use of less pure nitrogen which may under other conditions cause undesired oxidation at the cathode surfaces. In those cases where less pure nitrogen is used it may be necessary to add a similar small amount of hydrogen to the anode stream to avoid unnecessary early oxidation in the anode compartment. The inclusion of hydrogen during the higher temperature heating stage also chemically reduces any undesired oxides formed on the cathode surfaces as a result of impurities deposited during the removal of organic binder from the electrolyte tapes. It is during this higher temperature stage that the carbonates electrolyte softens and becomes pasty or liquid to impregnate the electrolyte matrix and porous electrodes. The cell should be maintained at temperatures above the electrolyte carbonates melting temperature, which will vary depending upon the carbonates mixture used as electrolyte carbonates, to allow the carbonates to satisfactorily distribute throughout the cell components. This time will vary dependent upon the cell size, pore size of the electrodes and electrolyte matrix, fluidity of the electrolyte carbonates and the like. Desired time for maintenance at such temperatures may be readily ascertained by one skilled in the art to allow the electrolyte carbonates to adequately distribute throughout the cell components.

After the electrolyte carbonates distribution is substantially complete, the cathode region of the cell may be flushed with nitrogen to substantially remove hydrogen present prior to introduction of conventional oxidant gases. This is desired to prevent the possibility of forming explosive mixtures. After such flushing with nitrogen, conventional oxidant gases, such as air and $CO_2$ mixtures, may be introduced to contact the cathode and fuel gas, typically hydrogen-containing gas, may be introduced to contact the anode for operation of the fuel cell.

Practice of the start-up process of this invention when commencing operation of molten carbonate fuel cells provides better binder removal while assuring high cathode electrical conductivity and catalytic activity for higher cell electrical output and more stable long-term cell operation.

The following specific example is set forth in detail to further specifically describe the invention and should not be considered to limit the invention in any way.

EXAMPLE

A stack of five cells, each being 1000 centimeter square in active area size and having a stabilized nickel anode, a nickel cathode, a green lithium aluminate matrix tape and a green electrolyte tape made of 62 mole percent lithium carbonate and 38 mole percent potassium carbonate and with separator plates made of stainless steel is subjected to start-up heating according to the schedule listed in the following table:

TABLE 1

| Low Temp. (°C.) | High Temp. (°C.) | Time of Heating (Hours) | Heating Rate (°C./hr.) | Environment (Gas Composition) |
|---|---|---|---|---|
| 25 | 150 | 2 | 62 | Flow of dry air in anode and cathode |
| 150 | 300 | 30 | 5 | Same compositions |
| 300 | Hold | 35 | 0 | Same compositions |
| 300 | 500 | 40 | 5 | 97% $N_2$/3% $H_2$ in both anode and cathode |
| 500 | 600 | 20 | 5 | 97% $N_2$/3% $H_2$ in the anode and 90% $N_2$/10% $CO_2$ in the cathode |
| 600 | 650 | 10 | 5 | Regular fuel and oxidant |

While in the foregoing specification this invention has been described in relation to certain preferred embodiments thereof, and many details have been set forth for purpose of illustration it will be apparent to those skilled in the art that the invention is susceptible to additional embodiments and that certain of the details described herein can be varied considerably without departing from the basic principles of the invention.

I claim:

1. A molten carbonate fuel cell start-up process comprising:

heating at least one cell unit comprising a metallic cathode, a metallic anode and green tapes comprising electrolyte matrix and electrolyte carbonate between said cathode and said anode to temperatures about 250° to about 350° C. in the presence of oxygen-containing gas;

continue heating to temperatures above the melting point of said electrolyte carbonate in the presence of inert gas and about 0.5 to about 10 mole percent hydrogen, based upon the total gas composition, and maintaining temperatures above the melting point of said electrolyte carbonate for a time sufficient for said carbonate to distribute itself to the cell components; and introducing oxidant gas to contact said cathode and fuel gas to contact said anode for operation of said fuel cell.

2. A molten carbonate fuel cell start-up process according to claim 1 wherein said heating in the presence of oxygen-containing gas is maintained to about 300° to about 350° C.

3. A molten carbonate fuel cell start-up process according to claim 2 wherein said oxygen-containing gas comprises air.

4. A molten carbonate fuel cell start-up process according to claim 1 wherein said continued heating in the presence of hydrogen is to temperatures about 500° C. to about 650° C.

5. A molten carbonate fuel cell start-up process according to claim 1 wherein said continued heating is in the presence of about 1 to about 5 mole percent hydrogen and to temperatures about 550° to about 650° C.

6. A molten carbonate fuel cell start-up process according to claim 5 wherein said heating in the presence of inert gas and hydrogen is maintained to about 600° to about 650° C.

7. A molten carbonate fuel cell start-up process according to claim 5 wherein said inert gas comprises nitrogen.

8. A molten carbonate fuel cell start-up process according to claim 1 wherein said oxygen-containing gas comprises air.

9. A molten carbonate fuel cell start-up process according to claim 1 wherein said heating in the presence of inert gas and hydrogen is maintained to about 600° to about 650° C.

10. A molten carbonate fuel cell start-up process according to claim 1 wherein said inert gas comprises nitrogen.

11. A molten carbonate fuel cell start-up process according to claim 1 wherein the cathode region of said cell is flushed with nitrogen to substantially remove said hydrogen prior to introduction of said oxidant.

12. A molten carbonate fuel cell start-up process according to claim 1 wherein said metallic cathode is selected from the group consisting of nickel, cobalt, and mixtures thereof.

13. A molten carbonate fuel cell start-up process according to claim 1 wherein said heating in the presence of oxygen-containing gas is maintained to about 300° to about 350° C; said oxygen-containing gas comprises air; said continued heating is to temperatures about 550° to about 650° C. and in the presence of about 1 to about 5 mole percent hydrogen; said heating in the presence of inert gas and hydrogen is maintained to about 600° to about 650° C.; and said inert gas comprises nitrogen.

14. In a molten carbonate fuel cell start-up process of heating said cell to operating temperatures about 600° to about 700° C., the improvement comprising; conducting heating in the temperature range from a lower temperature about 250° to about 350° C. to an upper temperature above the melting point of the carbonate electrolyte in the presence of inert gas and about 0.5 to about 10 mole percent hydrogen, based upon the total gas composition.

15. In a molten carbonate fuel cell start-up process according to claim 14 wherein said heating from said lower temperature to said upper temperature is in the presence of about 1 to about 5 mole percent hydrogen.

16. In a molten carbonate fuel cell start-up process according to claim 14 wherein said lower temperature is about 300° to about 350° C.

17. In a molten carbonate fuel cell start-up process according to claim 14 wherein said upper temperature is about 500° to about 650° C.

18. In a molten carbonate fuel cell start-up process according to claim 14 wherein said upper temperature is about 600° to about 650° C.

19. In a molten carbonate fuel cell start-up process according to claim 14 wherein said lower temperature is about 300° to about 350° C. and said upper temperature is about 600° to about 650° C.

20. In a molten carbonate fuel cell start-up process according to claim 14 wherein said inert gas comprises nitrogen.

21. In a molten carbonate fuel cell start-up process according to claim 14 wherein said heating from said lower temperature to said upper temperature is in the presence of about 1 to about 5 mole percent hydrogen, said lower temperature is about 300° to about 350° C. and said upper temperature is about 500° to about 650° C. and said inert gas comprises nitrogen.

* * * * *